US011838167B2

(12) United States Patent
Fukuzono et al.

(10) Patent No.: US 11,838,167 B2
(45) Date of Patent: Dec. 5, 2023

(54) WIRELESS COMMUNICATION SYSTEM, WIRELESS COMMUNICATION METHOD, AND WIRELESS COMMUNICATION DEVICE

(71) Applicant: NIPPON TELEGRAPH AND TELEPHONE CORPORATION, Tokyo (JP)

(72) Inventors: Hayato Fukuzono, Musashino (JP); Tomohiro Tokuyasu, Musashino (JP); Keita Kuriyama, Musashino (JP); Hiroyuki Furuya, Musashino (JP); Yu Ono, Musashino (JP); Tsutomu Tatsuta, Musashino (JP); Tomohiro Nakayama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 192 days.

(21) Appl. No.: 17/596,064

(22) PCT Filed: May 28, 2020

(86) PCT No.: PCT/JP2020/021043
§ 371 (c)(1),
(2) Date: Dec. 2, 2021

(87) PCT Pub. No.: WO2020/246356
PCT Pub. Date: Dec. 10, 2020

(65) Prior Publication Data
US 2022/0321392 A1 Oct. 6, 2022

(30) Foreign Application Priority Data

Jun. 5, 2019 (JP) ................................. 2019-105405

(51) Int. Cl.
*H04L 27/36* (2006.01)
*H04W 72/08* (2009.01)
(Continued)

(52) U.S. Cl.
CPC ............. *H04L 27/36* (2013.01); *H04W 28/18* (2013.01); *H04W 72/54* (2023.01)

(58) Field of Classification Search
CPC ..... H04L 1/0003; H04L 1/0015; H04L 27/36; H04W 24/02; H04W 28/18; H04W 72/54; H04W 84/16; H04M 11/00
See application file for complete search history.

(56) References Cited

U.S. PATENT DOCUMENTS 10,554,272 B2 * 2/2020 Tong ..................... H04W 48/08
2020/0015106 A1 * 1/2020 Lane .................... H04B 7/0695

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN);Overall description; Stage 2(Release 12). Jun. 2014.
(Continued)

*Primary Examiner* — David S Huang
(74) *Attorney, Agent, or Firm* — Harness, Dickey & Pierce, P.L.C.

(57) ABSTRACT

Provided is a wireless communication system configured to accommodate a plurality of circuits to transmit a signal from a transmitter to a receiver, the system including a number-of-circuits observation unit configured to observe the number of circuits among the plurality of circuits through which communication is being performed; a quality observation unit configured to observe a quality of each of a plurality of communications; a determination unit configured to determine a modulation scheme for transmitting a signal based on the number of circuits observed by the number-of-circuits (Continued)

observation unit, the quality of each of the plurality of communications observed by the quality observation unit, and a required throughput of each of the plurality of circuits; and a modulation unit configured to modulate the signal using the modulation scheme determined by the determination unit.

8 Claims, 7 Drawing Sheets

(51) Int. Cl.
*H04W 28/18* (2009.01)
*H04W 72/54* (2023.01)

(56) References Cited

OTHER PUBLICATIONS

The Telecommunication Technology Committee, "A Method for Speech Quality Assessment of IP Telephony". TTC Standard Standard, JJ-201.01, 5th edition, Aug. 25, 2008. English Translation attached.

\* cited by examiner

| MODULATION SCHEME | WIRELESS THROUGHPUT | NUMBER OF VOICE CIRCUITS CAPABLE OF BEING ACCOMMODATED |
| --- | --- | --- |
| QPSK | 100 kbps | ONE |
| 16QAM | 200 kbps | TWO |
| 64QAM | 300 kbps | THREE |

WIRELESS COMMUNICATION SYSTEM, WIRELESS COMMUNICATION METHOD, AND WIRELESS COMMUNICATION DEVICE

CROSS-REFERENCE TO RELATED APPLICATIONS

This application is a 371 U.S. National Phase of International Application No. PCT/JP2020/021043 filed on May 28, 2020, which claims priority to Japanese Application No. 2019-105405 filed on Jun. 5, 2019. The entire disclosures of the above applications are incorporated herein by reference.

TECHNICAL FIELD

The present invention relates to a wireless communication system, a wireless communication method, and a wireless communication device.

BACKGROUND ART

In a subscriber-based wireless communication system, for example, a subscriber station that accommodates a plurality of voice circuits and a base station which is connected to a network perform wireless communication to thereby realize voice communication for a plurality of calls that occur simultaneously.

For example, Non Patent Literature 1 discloses an overview of wireless interface protocol architecture. In addition, Non Patent Literature 2 discloses a method of specifying and evaluating quality parameters to be considered by a service provider.

CITATION LIST

Non Patent Literature

Non Patent Literature 1: 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 3GPP TS 36.300 V12.2.0 (2014-06)
Non Patent Literature 2: TTC Standard, A Method for Speech Quality Assessment of IP Telephony, Aug. 25, 2008, Telecommunication Technology Committee, 5th edition

SUMMARY OF THE INVENTION

Technical Problem

In a digital wireless system, a technique of changing a modulation order in accordance with a signal to noise ratio (SNR) is known. However, in the related art, there may be no effective control for further increasing the quality of communication.

An object of the present invention is to provide a wireless communication system, a wireless communication method, and a wireless communication device that make it possible to effectively increase the quality of communication.

Means for Solving the Problem

According to an aspect of the present invention, there is provided a wireless communication system configured to accommodate a plurality of circuits to transmit a signal from a transmitter to a receiver, the system including a number-of-circuits observation unit configured to observe the number of circuits among the plurality of circuits through which a plurality of communications are being performed, a quality observation unit configured to observe a quality of each of the plurality of communications, a determination unit configured to determine a modulation scheme for transmitting a signal based on the number of circuits observed by the number-of-circuits observation unit, the quality of each of the plurality of communications observed by the quality observation unit, and a required throughput of each of the plurality of circuits, and a modulation unit configured to modulate the signal using the modulation scheme determined by the determination unit.

In addition, according to another aspect of the present invention, there is provided a wireless communication method of accommodating a plurality of circuits to transmit a signal from a transmitter to a receiver, the method including observing the number of circuits among the plurality of circuits through which a plurality of communications are being performed, observing a quality of each of the plurality of communications, determining a modulation scheme for transmitting a signal based on the observed number of circuits, the observed quality of each of the plurality of communications, and a required throughput of each of the plurality of circuits, and modulating the signal using the determined modulation scheme.

In addition, according to yet another aspect of the present invention, there is provided a wireless communication device configured to accommodate a plurality of circuits to transmit a signal, the device including a number-of-circuits observation unit configured to observe the number of circuits among the plurality of circuits through which a plurality of communications are being performed, a quality observation unit configured to observe a quality of each of the plurality of communications, a determination unit configured to determine a modulation scheme for transmitting a signal based on the number of circuits observed by the number-of-circuits observation unit, the quality of each of the plurality of communications observed by the quality observation unit, and a required throughput of each of the plurality of circuits, and a modulation unit configured to modulate the signal using the modulation scheme determined by the determination unit.

Effects of the Invention

According to the present invention, it is possible to effectively increase the quality of communication.

DESCRIPTION OF EMBODIMENTS

Figure 1:
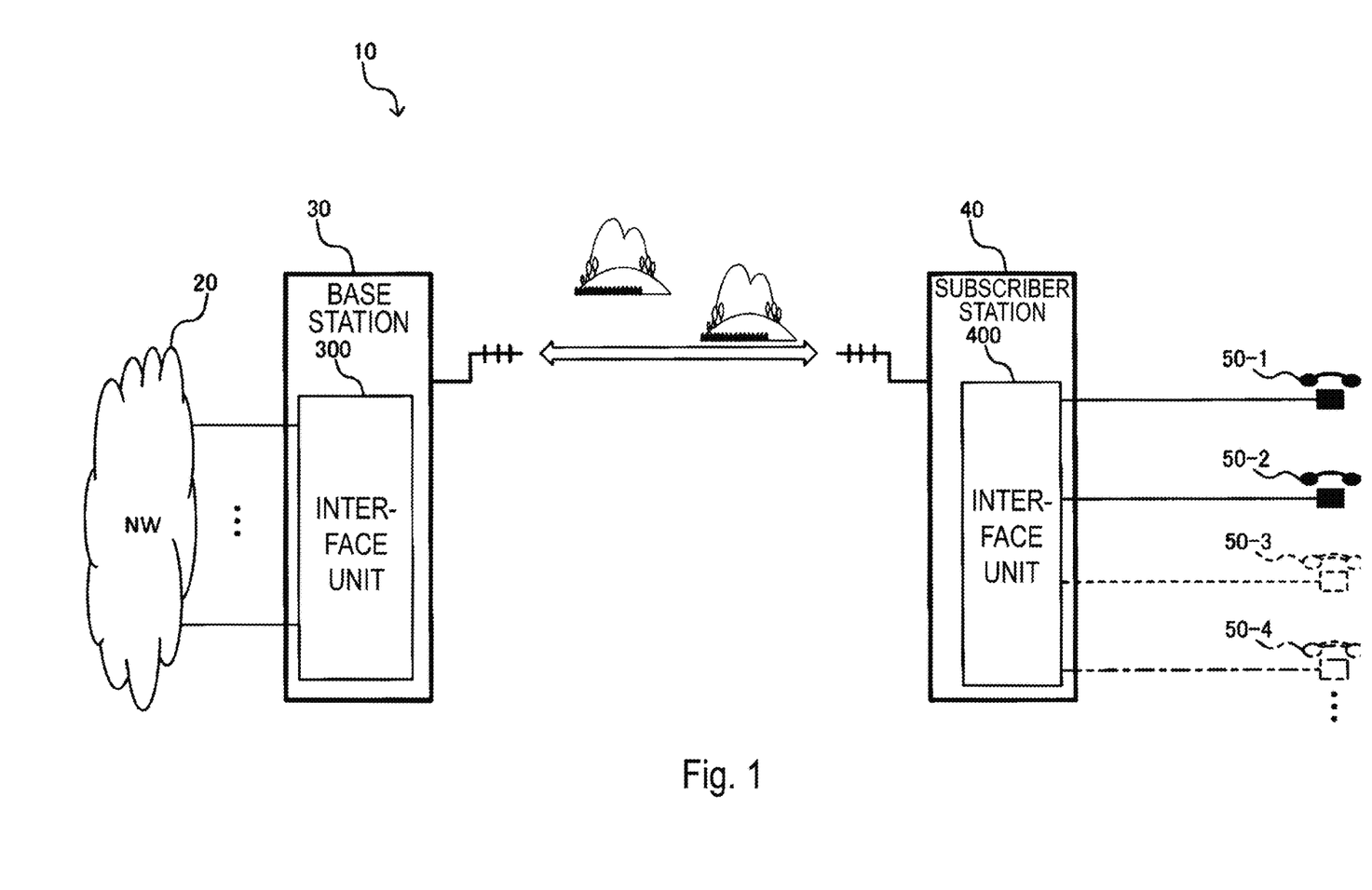
FIG. 1 is a diagram illustrating a configuration example of a wireless communication system according to an embodiment.

Hereinafter, an embodiment of a wireless communication system will be described with reference to the accompanying drawings. FIG. 1 is a diagram illustrating a configuration example of a wireless communication system 10 according to an embodiment. As illustrated in FIG. 1, the wireless communication system 10 is a digital subscriber-based wireless system including a base station 30 connected to a network 20 and a subscriber station 40 that performs full duplex wireless communication such as, for example, voice communication with the base station 30.

Insofar as the wireless communication system 10 performs digital wireless communication, it is not limited to a system that accommodates a voice circuit, and may be a system that accommodates a circuit for data communication.

The base station 30 is a wireless communication device in which an interface unit 300 provided therein is connected to the network 20, and has the functions of a transmitter and a receiver. The interface unit 300 performs control so as to interface between an internal signal of the base station 30 and an external signal of the base station 30.

The subscriber station 40 is a wireless communication device in which an interface unit 400 provided therein is connected to, for example, a plurality of telephone terminals 50-1 to 50-4 or the like, and has the functions of a transmitter and a receiver. The interface unit 400 performs control so as to interface between an internal signal of the subscriber station 40 and an external signal of the subscriber station 40.

Here, it is shown that, for example, the telephone terminals 50-1 and 50-2 simultaneously have calls in progress, the telephone terminal 50-3 is ending a call, and the telephone terminal 50-4 is in a non-call state.

Figure 2:
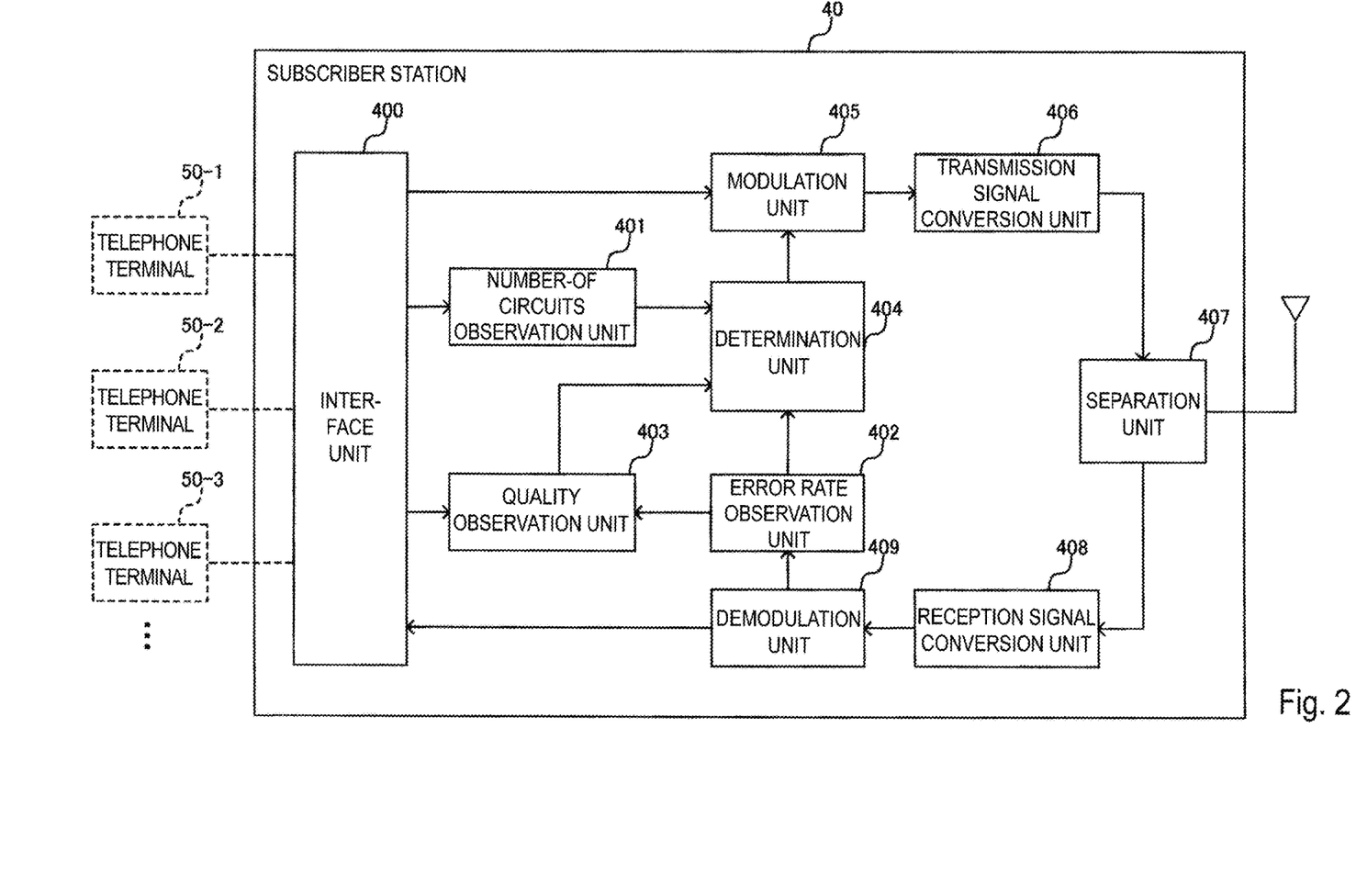
FIG. 2 is a diagram illustrating a configuration example of a subscriber station according to an embodiment.

FIG. 2 is a diagram illustrating a configuration example of the subscriber station 40 according to an embodiment. As illustrated in FIG. 2, the subscriber station 40 includes the interface unit 400, a number-of-circuits observation unit 401, an error rate observation unit 402, a quality observation unit 403, a determination unit 404, a modulation unit 405, a transmission signal conversion unit 406, a separation unit 407, a reception signal conversion unit 408, and a demodulation unit 409.

The interface unit 400 is connected to the external telephone terminals 50-1 to 50-4 and the like, and outputs signals which are input from the telephone terminals 50-1 to 50-4 and the like to the number-of-circuits observation unit 401, the quality observation unit 403, and the modulation unit 405. In addition, the interface unit 400 outputs a signal which is input from the demodulation unit 409 to the telephone terminals 50-1 to 50-4 and the like.

The number-of-circuits observation unit 401 observes the number of circuits through which simultaneous communication is being performed (for example, calls are simultaneously occurring), and outputs the observed number of circuits to the determination unit 404.

The error rate observation unit 402 calculates the error rate of a reception signal which is input from the demodulation unit 409 to be described later, and outputs, for example, the calculated error rate and the reception signal to the quality observation unit 403 and the determination unit 404. Note that the error rate is also one of parameters indicating the quality of a signal.

The quality observation unit 403 observes the quality of a signal including, for example, an R value (overall call quality index: rating factor) or the like with respect to a signal which is input from the interface unit 400 and a signal which is input from the error rate observation unit 402, and outputs the observed quality of each signal to the determination unit 404.

The determination unit 404 determines a modulation scheme for transmitting a signal based on the number of circuits observed by the number-of-circuits observation unit 401, the quality of each signal observed by the quality observation unit 403, and the required throughput of each of the plurality of circuits, and outputs the determined result to the modulation unit 405. Examples of the modulation scheme include quadrature phase shift keying (QPSK) having 4 values per symbol, 16 quadrature amplitude modulation (QAM) having 16 values per symbol, 64QAM having 64 values per symbol, and the like.

Figure 3:
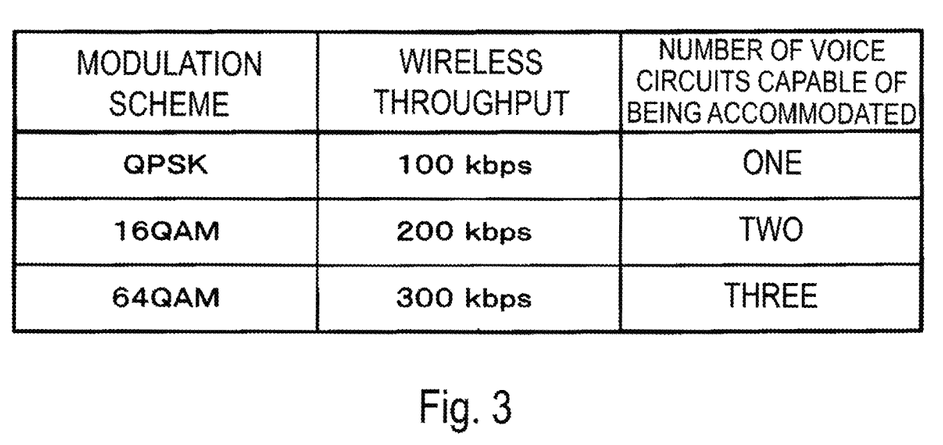
FIG. 3 is a diagram illustrating options of modulation schemes determined by a determination unit.

FIG. 3 is a diagram illustrating options of modulation schemes determined by the determination unit 404. As illustrated in FIG. 3, for example, in the case of modulation with QPSK, the wireless throughput is 100 kbps, and the number of voice circuits capable of being accommodated while a required quality is satisfied is one. In the case of modulation with 16QAM, the wireless throughput is 200 kbps, and the number of voice circuits capable of being accommodated while the required quality is satisfied is two. In the case of modulation with 64QAM, the wireless throughput is 300 kbps, and the number of voice circuits capable of being accommodated while the required quality is satisfied is three.

These modulation schemes are characterized in that, in a case where the order of the modulation scheme is decreased, although the number of circuits capable of being accommodated while the required quality is satisfied decreases, the quality of communication is improved. In the case of a high SNR and high-order modulation (such as 64QAM), when the wireless throughput is excessively large with respect to the required throughput of a circuit, it is preferable to decrease the modulation order to low-order modulation (such as QPSK) and stabilize the quality of communication to be high.

Consequently, the determination unit 404 determines the modulation scheme so that the modulation order is minimized, for example, while the quality of each communication observed by the quality observation unit 403 satisfies the required quality. Note that information indicating the required throughput of each of a plurality of circuits may be provided in advance by the determination unit 404, or may be stored by a storage unit (not illustrated).

The modulation unit 405 (FIG. 2) modulates a transmission signal using a modulation scheme determined by the determination unit 404, and outputs the modulated transmission signal to the transmission signal conversion unit 406. For example, the modulation unit 405 modulates (adaptively modulates) the transmission signal using any of BPSK, QPSK, 16QAM, 64QAM, or 256QAM.

The transmission signal conversion unit 406 converts the transmission signal modulated by the modulation unit 405 into a predetermined radio frequency (RF) signal, and outputs the converted signal to the separation unit 407.

The separation unit 407 includes an RF circuit that transmits and receives radio-frequency signals through an antenna, and has a function of separating a transmission signal from a reception signal.

The reception signal conversion unit 408 converts the radio-frequency reception signal separated by the separation unit 407 into a baseband signal, and outputs the converted signal to the demodulation unit 409.

The demodulation unit 409 demodulates the reception signal using a demodulation scheme corresponding to the modulation scheme, and outputs the demodulated reception signal to the error rate observation unit 402 and the interface unit 400.

Figure 4:
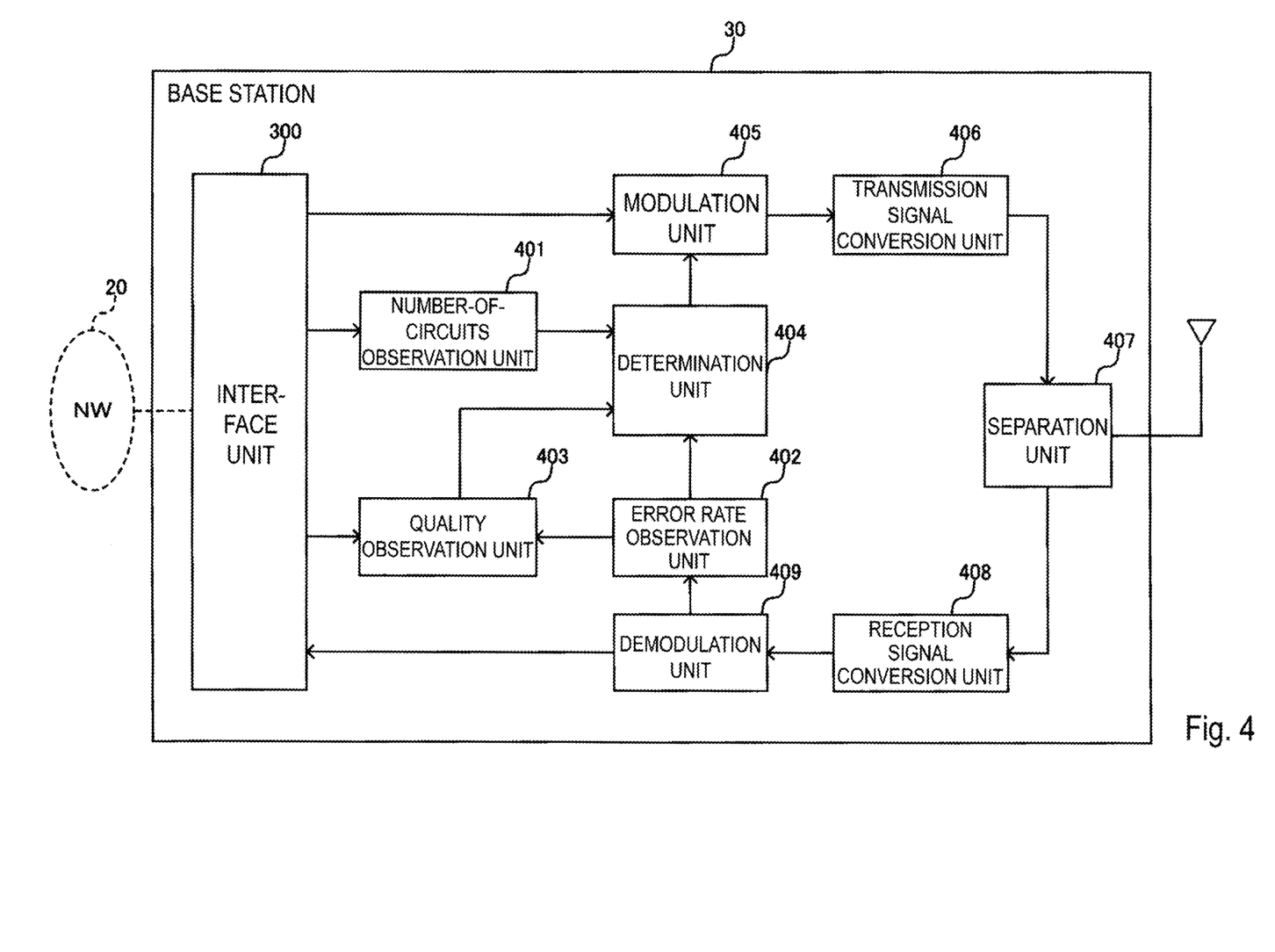
FIG. 4 is a diagram illustrating a configuration example of a base station according to an embodiment.

FIG. 4 is a diagram illustrating a configuration example of the base station 30 according to an embodiment. As illustrated in FIG. 4, the base station 30 includes the interface unit 300, the number-of-circuits observation unit 401, the error rate observation unit 402, the quality observation unit 403, the determination unit 404, the modulation unit 405, the transmission signal conversion unit 406, the separation unit 407, the reception signal conversion unit 408, and the demodulation unit 409.

Note that substantially the same components as the portions constituting the subscriber station 40 illustrated in FIG. 2 among portions constituting the base station 30 illustrated in FIG. 4 are denoted by the same reference numerals and signs.

The interface unit 300 is connected to the external network 20, and outputs a signal which is input from the network 20 or the like to the number-of-circuits observation unit 401, the quality observation unit 403, and the modulation unit 405. In addition, the interface unit 300 outputs a signal which is input from the demodulation unit 409 to the network 20.

Figure 5:
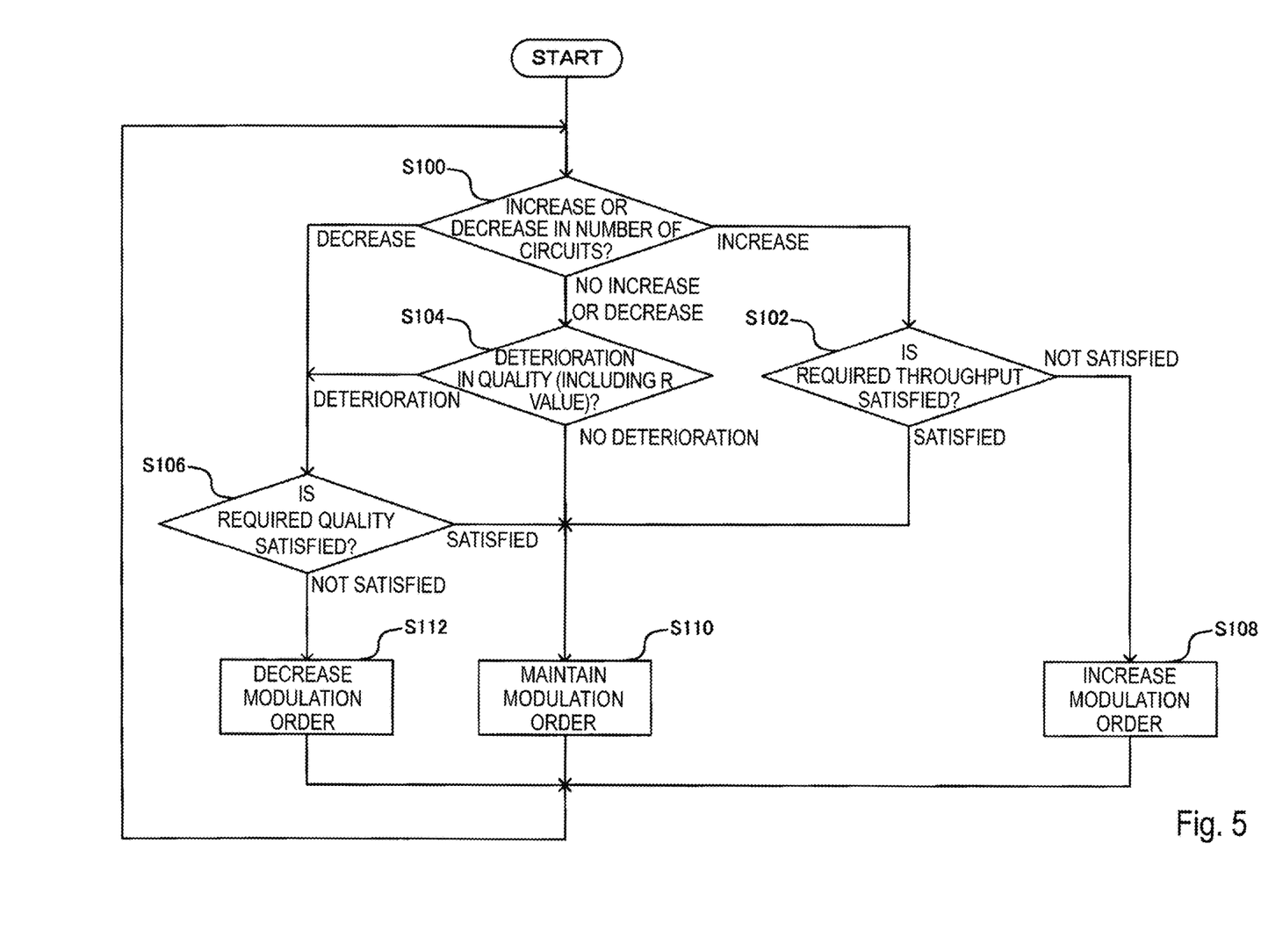
FIG. 5 is a flowchart illustrating an operation example of the determination unit.

Next, an operation example of the wireless communication system 10 will be described. Here, first, an operation example of the determination unit 404 will be described in detail. FIG. 5 is a flowchart illustrating an operation example of the determination unit 404.

As illustrated in FIG. 5, the determination unit 404 first determines whether there is an increase or decrease in the number of circuits through which simultaneous communication is being performed which is input from the number-of-circuits observation unit 401 (S100). Here, the determination unit 404 proceeds to the process of S102 in a case where it is determined that the number of circuits through which simultaneous communication is being performed is increasing. In addition, the determination unit 404 proceeds to the process of S104 in a case where it is determined that there is no increase or decrease in the number of circuits through which simultaneous communication is being performed. In addition, the determination unit 404 proceeds to the process of S106 in a case where it is determined that the number of circuits through which simultaneous communication is being performed is decreasing.

In the process of S102, the determination unit 404 determines whether wireless communication satisfies a required throughput. The determination unit 404 proceeds to the process of S108 in a case where it is determined that the wireless communication does not satisfy the required throughput, and proceeds to the process of S110 in a case where it is determined that the wireless communication satisfies the required throughput.

In the process of S104, the determination unit 404 determines whether there is a deterioration in the quality of the wireless communication (including an R value). The determination unit 404 proceeds to the process of S106 in a case where it is determined that there is a deterioration in the quality of the wireless communication, and proceeds to the process of S110 in a case where it is determined that there is no deterioration.

In the process of S106, the determination unit 404 determines whether the wireless communication satisfies the required quality. The determination unit 404 proceeds to the process of S110 in a case where it is determined that the wireless communication satisfies the required quality, and proceeds to the process of S112 in a case where it is determined that the wireless communication does not satisfy the required quality.

In the process of S108, the determination unit 404 makes a determination that the modulation unit 405 increases the modulation order of the modulation scheme for modulating a transmission signal, and returns to the process of S100.

In the process of S110, the determination unit 404 makes a determination that the modulation unit 405 maintains the modulation order of the modulation scheme for modulating a transmission signal, and returns to the process of S100.

In the process of S112, the determination unit 404 makes a determination that the modulation unit 405 decreases the modulation order of the modulation scheme for modulating a transmission signal, and returns to the process of S100.

Figure 6:
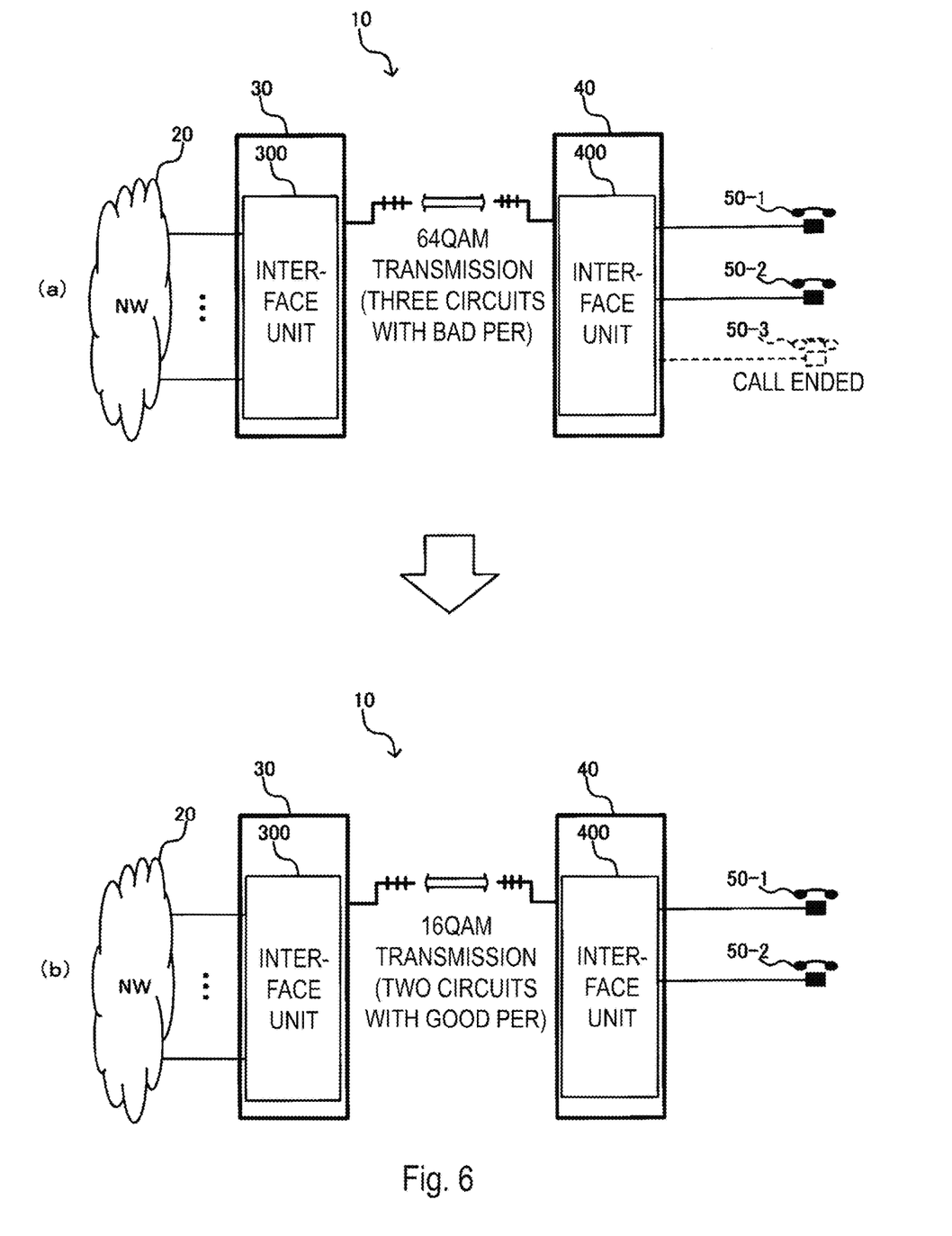
FIG. 6(a) is a diagram illustrating an operation state of a wireless communication system when the number of circuits through which calls are being simultaneously performed by telephone terminals and the like decreases.
FIG. 6(b) is a diagram illustrating an operation result of the wireless communication system according to a decrease in the number of circuits through which calls are being simultaneously performed.

Next, a specific operation example of the wireless communication system 10 will be described with reference to FIGS. 6 and 7. FIG. 6 is a diagram illustrating a first example of an operation of the wireless communication system 10. FIG. 6(a) is a diagram illustrating an operation state of the wireless communication system 10 when the number of circuits through which calls are being simultaneously performed by the telephone terminal 50-1 and the like decreases. FIG. 6(b) is a diagram illustrating an operation result of the wireless communication system 10 according to a decrease in the number of circuits through which calls are being simultaneously performed.

As illustrated in FIG. 6(a), for example, in the wireless communication system 10, the telephone terminal 50-3 out of the three telephone terminals 50-1 to 50-3 which are simultaneously performing calls is assumed to have ended its call. In the wireless communication system 10, because calls with three circuits are accommodated, signals are transmitted by the modulation of 64QAM (see FIG. 3).

As described above, the modulation scheme is characterized in that, in a case where the order of the modulation scheme is decreased, although the number of circuits capable of being accommodated while the required quality is satisfied decreases, the quality of communication is improved. That is, in a case where the number of circuits which are simultaneously performing calls decreases from 3 to 2, the quality of communication represented by an R value, an SNR, a packet error rate (PER), or the like becomes lower than the quality of communication that can be realized by the wireless communication system 10.

Consequently, as illustrated in FIG. 6(b), the wireless communication system 10 changes the modulation scheme so that signals are transmitted by the modulation of 16QAM capable of accommodating two circuits simultaneously. As also illustrated in FIG. 3, in the wireless communication system 10, signals are transmitted by the modulation of 16QAM, and although wireless throughput decreases, two circuits can be accommodated.

That is, in the wireless communication system 10, the modulation scheme for transmitting signals is determined and changed based on the number of circuits observed by the number-of-circuits observation unit 401, the quality of each communication observed by the quality observation unit 403, and the required throughput of each of the circuits, and thus it is possible to improve the quality of communication of the telephone terminals 50-1 and 50-2 that perform communication simultaneously.

Figure 7:
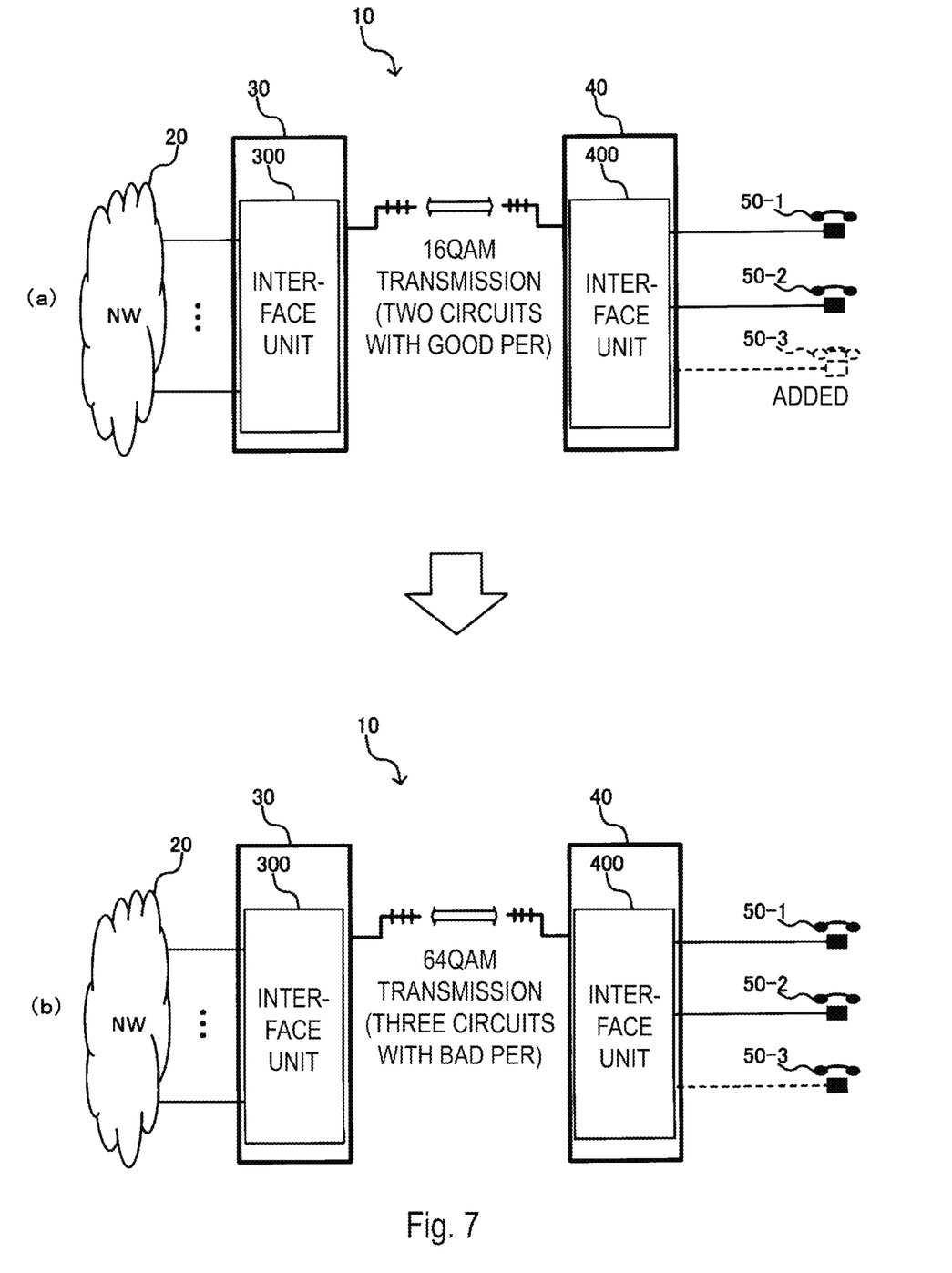
FIG. 7(a) is a diagram illustrating an operation state of the wireless communication system when the number of circuits through which calls are being simultaneously performed by telephone terminals and the like increases.
FIG. 7(b) is a diagram illustrating an operation result of the wireless communication system according to an increase in the number of circuits through which calls are being simultaneously performed.

FIG. 7 is a diagram illustrating a second example of the operation of the wireless communication system 10. FIG. 7(a) is a diagram illustrating an operation state of the wireless communication system 10 when the number of circuits through which the telephone terminal 50-1 and the like are simultaneously performing calls increases. FIG. 7(b) is a diagram illustrating an operation result of the wireless communication system 10 according to an increase in the number of circuits through which calls are being simultaneously performed.

As illustrated in FIG. 7(a), for example, in the wireless communication system 10, a call of the telephone terminal 50-3 is assumed to be added to the two telephone terminals 50-1 and 50-2 which are simultaneously performing calls. In the wireless communication system 10, because two circuits of calls are accommodated, signals are transmitted by the modulation of 16QAM (see FIG. 3).

In the plurality of modulation schemes described above, in a case where the order of the modulation scheme is increased, although the quality of communication such as the PER decreases in the range of the required quality, the wireless throughput can be improved.

Consequently, in the wireless communication system 10, as illustrated in FIG. 7(b), the modulation scheme is changed so that signals are transmitted by the modulation of 64QAM capable of accommodating three circuits simultaneously. As also illustrated in FIG. 3, in the wireless communication system 10, signals are transmitted by the modulation of 64QAM to increase the wireless throughput, and three circuits can be accommodated.

That is, in the wireless communication system 10, the modulation scheme for transmitting signals is determined and changed based on the number of circuits observed by the number-of-circuits observation unit 401, the quality of each communication observed by the quality observation unit 403, and the required throughput of each of the circuits, and thus it is possible to improve the quality of communication including R values of the telephone terminals 50-1 to 50-3 that perform communication simultaneously.

Note that the wireless communication system 10 needs to include at least the modulation unit 405 in a case where the base station 30 and the subscriber station 40 transmit signals. However, only one of the base station 30 and the subscriber station 40 may be configured to include the number-of-circuits observation unit 401, the error rate observation unit 402, the quality observation unit 403, and the determination unit 404, share information observed by performing mutual communication, and change the modulation order.

In this manner, in the wireless communication system 10, the minimum necessary modulation order is adopted in accordance with the number of connection circuits, and thus it is possible to stabilize the quality of communication to a maximum degree.

Further, some or all of the units constituting the base station 30 and the subscriber station 40 in the above-described embodiment may be configured as hardware, or may be configured by causing a processor to execute a program.

In addition, in a case where some or all of the units constituting the base station 30 and the subscriber station 40 are configured by causing a processor to execute a program, the program may be recorded in a recording medium and supplied, or may be supplied through a network.

REFERENCE SIGNS LIST

10 Wireless communication system
20 Network
30 Base station
40 Subscriber station
50-1 to 50-4 Telephone terminal
300, 400 Interface unit
401 Number-of-circuits observation unit
402 Error rate observation unit
403 Quality observation unit
404 Determination unit
405 Modulation unit
406 Transmission signal conversion unit
407 Separation unit
408 Reception signal conversion unit
409 Demodulation unit

The invention claimed is:

1. A wireless communication system configured to accommodate a plurality of circuits to transmit a signal from a transmitter to a receiver, the system comprising:
   a number-of-circuits observation unit configured to observe the number of circuits among the plurality of circuits through which a plurality of communications are being performed;
   a quality observation unit configured to observe a quality of each of the plurality of communications;
   a determination unit configured to determine a modulation scheme for transmitting a signal based on the number of circuits observed by the number-of-circuits observation unit, the quality of each of the plurality of communications observed by the quality observation unit, and a required throughput of each of the plurality of circuits; and
   a modulation unit configured to modulate the signal using the modulation scheme determined by the determination unit.

2. The wireless communication system according to claim 1, wherein the determination unit determines the modulation scheme so that a modulation order is minimized while the quality of each of the plurality of communications observed by the quality observation unit satisfies a required quality.

3. The wireless communication system according to claim 1, wherein at least one of the plurality of circuits is a voice circuit.

4. A wireless communication method of accommodating a plurality of circuits to transmit a signal from a transmitter to a receiver, the method comprising:
   observing the number of circuits among the plurality of circuits through which communication is being performed;
   observing a quality of each of a plurality of communications;
   determining a modulation scheme for transmitting a signal based on the observed number of circuits, the observed quality of each of the plurality of communications, and a required throughput of each of the plurality of circuits; and
   modulating the signal using the determined modulation scheme.

5. The wireless communication method according to claim 4, wherein the determining includes determining the modulation scheme so that a modulation order is minimized while the observed quality of each of the plurality of communications satisfies a required quality.

6. The wireless communication method according to claim 4, wherein at least one of the circuits is a voice circuit.

7. A wireless communication device configured to accommodate a plurality of circuits to transmit a signal, the device comprising:
- a number-of-circuits observation unit configured to observe the number of circuits through which a plurality of communications are being performed;
- a quality observation unit configured to observe a quality of each of the plurality of communications;
- a determination unit configured to determine a modulation scheme for transmitting a signal based on the number of circuits observed by the number-of-circuits observation unit, the quality of each of the plurality of communications observed by the quality observation unit, and a required throughput of each of the plurality of circuits; and
- a modulation unit configured to modulate the signal using the modulation scheme determined by the determination unit.

8. The wireless communication device according to claim 7, wherein the determination unit determines a modulation scheme so that a modulation order is minimized while the quality of each of the plurality of communications observed by the quality observation unit satisfies a required quality.

* * * * *